United States Patent

[11] 3,524,370

| [72] | Inventor | Thomas T. Thompson<br>1573 Fixler Road, Sharon Center, Ohio 44274 |
|---|---|---|
| [21] | Appl. No. | 683,385 |
| [22] | Filed | Nov. 15, 1967 |
| [45] | Patented | Aug. 18, 1970 |

[54] ADJUSTABLE PROGRESSIVE PUNCH DIE
3 Claims, 7 Drawing Figs.

[52] U.S. Cl.................................................. 83/255,
83/620, 83/641, 83/682, 83/685
[51] Int. Cl..................................................... B26d 5/08,
B26f 1/14
[50] Field of Search......................................... 83/685,
687, 691, 682, 620, 619, 255, 640, 641; 29/465

[56] References Cited
UNITED STATES PATENTS

| 1,304,441 | 5/1919 | Bartee........................... | 83/620 |
| 1,402,284 | 1/1922 | Daniels......................... | 83/620X |
| 2,325,230 | 7/1943 | Crane............................ | 83/255X |
| 2,504,642 | 4/1950 | Burgess........................ | 29/465 |

FOREIGN PATENTS

| 957,615 | 5/1964 | Great Britain............ | 83/687 |

*Primary Examiner*— James M. Meister
*Attorney*—Freeman and Taylor

ABSTRACT: An adjustable progressive punch die wherein material in strip form is fed between reciprocating portions of a punch die and provision is made to adjust the spacing of die punch components with respect to the direction of longitudinal feed of the material whereby the width of the punched product may be varied by adjusting the distance between the die punch components.

Patented Aug. 18, 1970

INVENTOR.
THOMAS T. THOMPSON
BY
Freeman + Taylor
ATTORNEYS

Patented Aug. 18, 1970    3,524,370

INVENTOR.
THOMAS T. THOMPSON
BY Freeman + Taylor
ATTORNEYS

Patented Aug. 18, 1970

INVENTOR.
THOMAS T. THOMPSON
BY
*Freeman + Taylor*
ATTORNEYS

3,524,370

ADJUSTABLE PROGRESSIVE PUNCH DIE

BACKGROUND OF THE INVENTION

The invention in general relates to die punches used for forming articles by punching out pieces of desired configurations from strips of material.

The particular field of use of the invention is with regard to tire sipes. In the art of tire manufacturing, sipes are frequently employed for the purpose of providing male projections on the tire curing mold so as to result in grooves or slots being produced in the finished tire.

Because of the fact that tire dimensions vary considerably, it follows that the dimensions of the sipe will accordingly vary with this variance being normally in the width dimension due to the fact that the heighth of the sipe determines the depth of the groove in the tire which is generally uniform in the tread regions.

Heretofore, it has been necessary in punch die operations to produce separate dies for each width of sipe required, with the result that the manufacturer is faced with undue die expense and is accordingly invariably restricted in the selection of sipe widths that are available as a practical matter.

DESCRIPTION OF THE PRIOR ART

Applicant is cognizant only of the prior art wherein progressive die operations are performed by a series of die punch points that are fixed with respect to each other along the longitudinal path of feed of the material being punched.

SUMMARY OF THE INVENTION

In performing the operation of die punching a sipe, it follows that not only must the sipe be trimmed to a uniform heighth but also that the width must conform to the specifications required of the particular job.

Applicant has discovered that by positioning one of the die punch components of each male and female die in a relatively fixed position that an almost infinite adjustment of sipe widths can be achieved by shifting the remaining component of the punch die members along the longitudinal path of feed. This adjustment, coupled with the adjustment of the length of stock feed per cycle of operation, enables the user of this improved die punch equipment to vary the width of the sipe being produced with a minimal amount of adjustment of the punch die.

By this provision, users of the improved punch die are permitted to utilize the same die to produce an almost infinite number of sipe widths all of uniform heighth and all having locating components either at their midpoints or elsewhere within the sipe width.

Production of an adjustable progressive punch die of the character above described accordingly becomes the principal object of this invention with other objects of the invention becoming more apparent upon a reading of the following brief specification, considered and interpreted in the light of the accompanying drawings.

OF THE DRAWINGS

Figure 2:
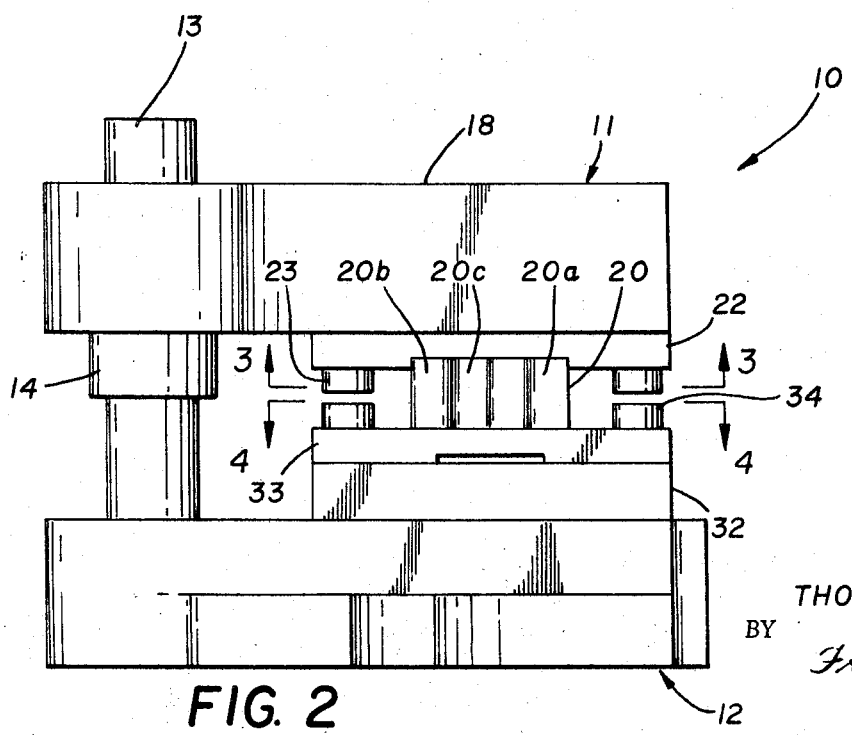
FIGURE 2 is a side elevational view of the improved adjustable progressive punch die.
Figure 3:
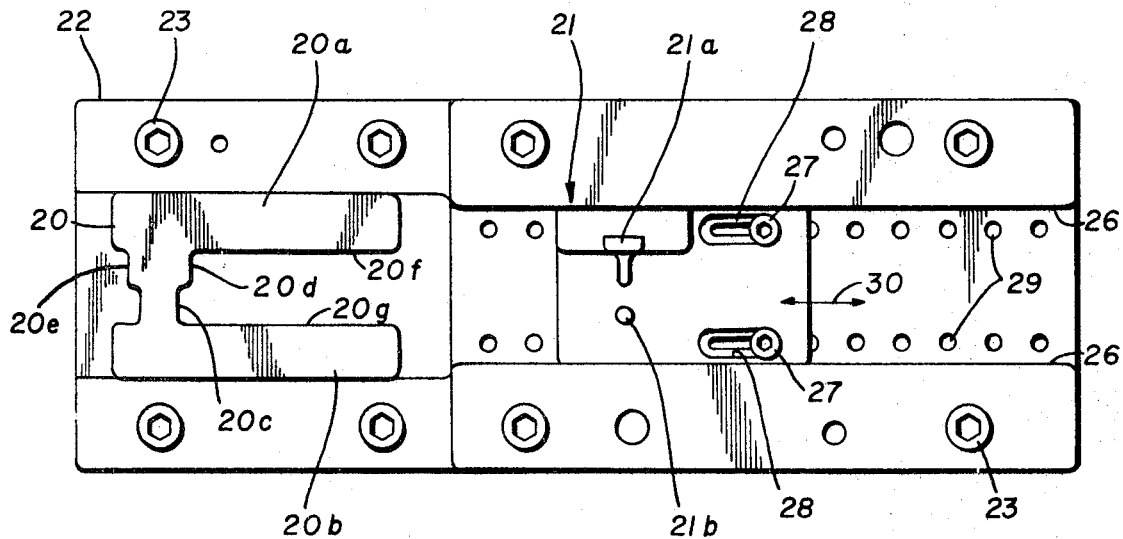
Figure 4:
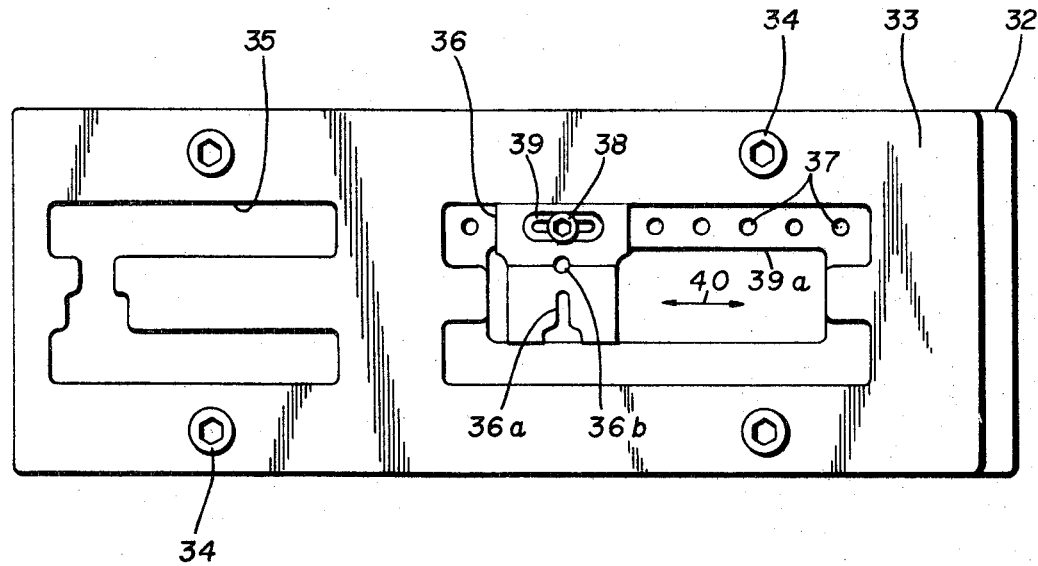

FIGURES 3 and 4 are horizontal sectional views taken on the lines 3-3 and 4-4 of FIGURE 2.

Figure 5:
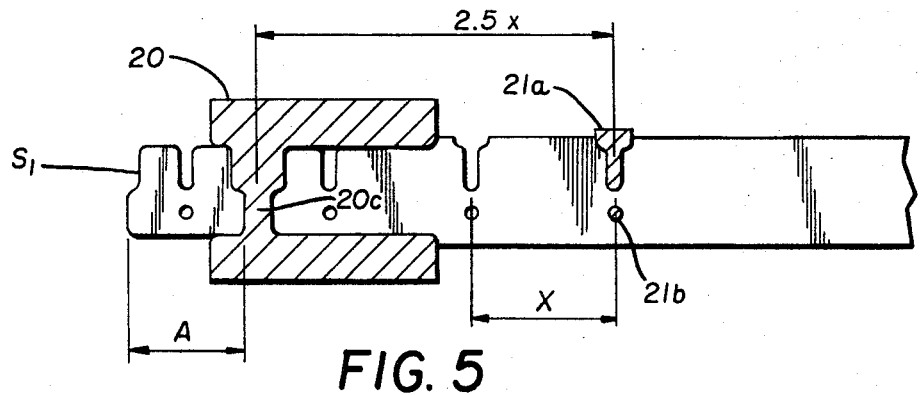

FIGURE 5 is a schematic view illustrating one spacing of the adjustable punch die components adapted to produce a sipe given width.

Figure 6:
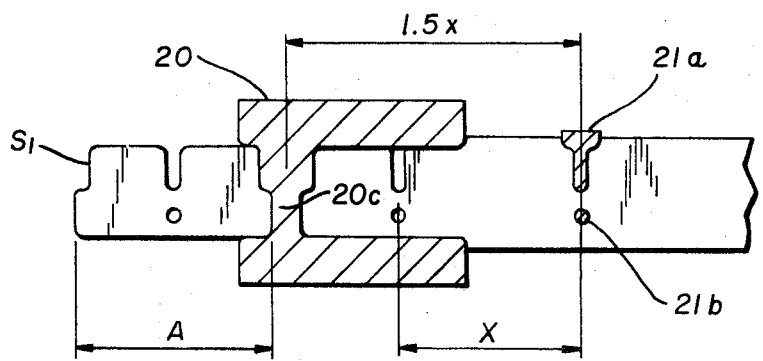

FIGURE 6 is a view similar to FIGURE 5 but illustrating the use of a different spacing wherein a different sipe width is produced by use of the same die.

Figure 7:
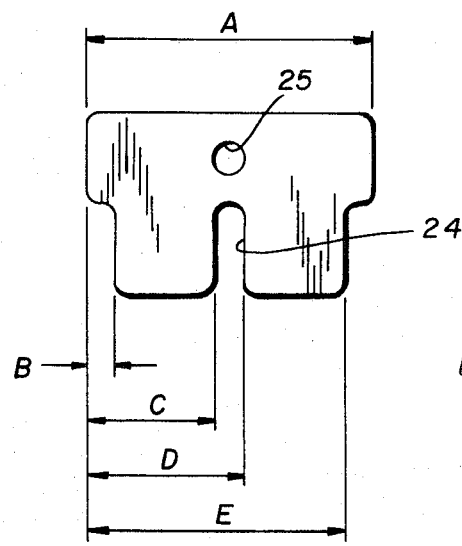

FIGURE 7 is a plan view of a sipe produced by the improved punch die.

DESCRIPTION OF THE PREFERRED EMBODIMENT

Figure 1:
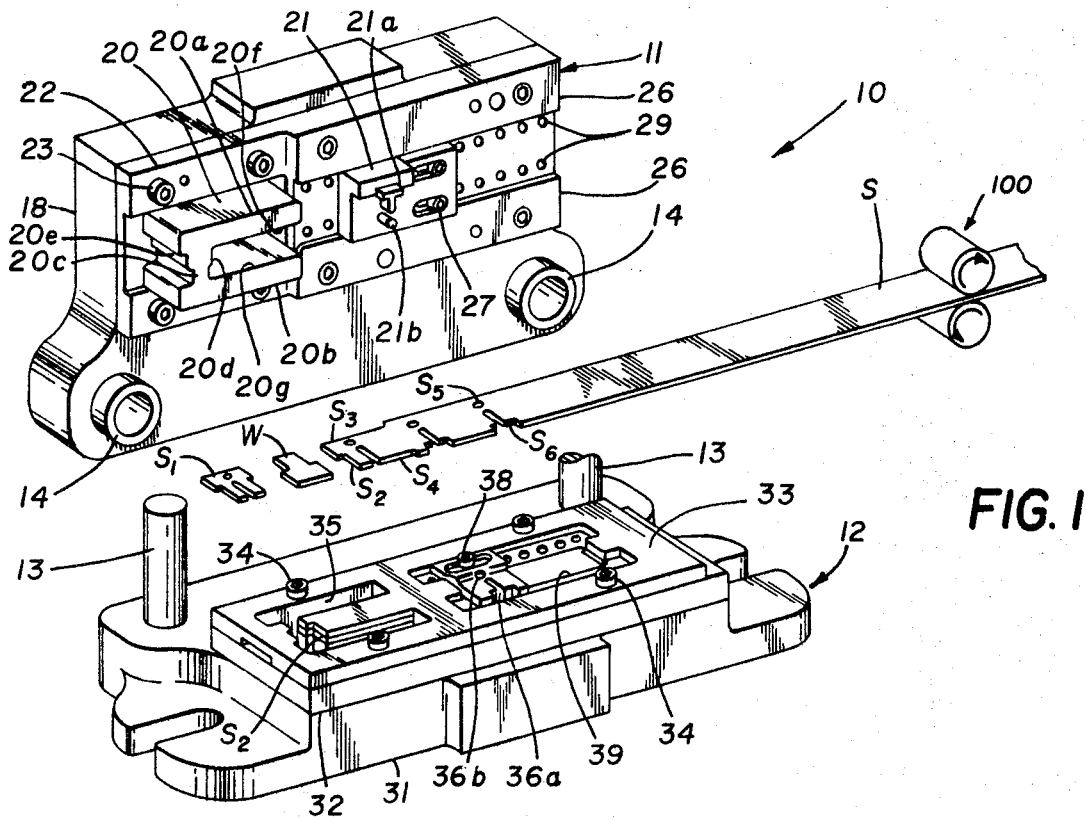
FIGURE 1 is a perspective view of the improved progressive punch die showing the upper or male component thereof being rotated 90 degrees for the sake of clarity and description of the invention, and schematically illustrating the severing steps that occur with regard to the advancing strip material that is being fed therebetween as will be presently described.

Referring now to the drawings and in particular to FIGURE 1, the improved adjustable progressive punch die, generally designated by the numeral 10, includes an upper male punch die 11 and a lower female punch die 12 that includes rods 13, 13 that are received in bushings 14, 14 of upper die 11 so as to permit up and down movement of the male die 11 with regard to the female die 12 in a manner well understood in the prior art.

A strip of material S is shown schematically being advanced by conventional feed rolls, generally indicated by the numeral 100, between the faces of the upper and lower dies with the severed portions of material S being shown schematically as being broken off to illustrate the progressive die punching of the strip as it advances between the die faces.

Again referring to FIGURE 1, the male punch die 11 includes an upper die shoe portion 18 to which is mounted a set of dies that includes a primary male stamping component 20 and an auxiliary adjustable male stamping component 21, with the former being of generally U-shaped configuration and including an upper leg 20a, a lower leg 20b and a connecting base component 20c, with FIGURE 3 showing that the connecting portion 20c includes one design imparting edge 20d and an opposed design imparting edge 20e.

With reference to the primary male die component 20, the same is retained in place by the usual frame member 22 that is secured in known fashion to the body 18 by the usual bolts 23, 23 with this manner of attachment being conventional and with no novelty per se being claimed for this construction.

With reference to the auxiliary adjustable component 21, the same, as best shown in FIGURES 1 and 3, generally includes a T-shaped component 21a and a circular punching component 21b, with these components being in transverse alignment so as to facilitate stamping of the slot 24 and aperture 25 that are shown best in FIGURE 7 of the drawings. Again the adjustable auxiliary stamping component 21 is mounted between the ways of guide members 26, 26 with adjustment being facilitated by the use of bolts 27, 27 that bear against the inner walls of slots 28, 28 as best shown in detail in FIGURE 3 of the drawings.

It is believed apparent in this regard that by loosening the bolts 27, 27 that the auxiliary die member 21 can be shifted in either direction indicated by arrow 30, with the bolts 27, 27 being selectively positioned in the threaded and tapped apertures 29, 29 in the body 18 of upper die 11 and then moved to final adjustment within the slots 28 so as to permit infinite adjustment of the same along the direction of arrow 30.

Turning next to FIGURES 1 and 4 for a consideration of the structure of the lower female die component 12, the same includes a bottom die shoe 31 and a rectangular frame portion 32 mounted thereon that, in turn, serves as a die for the male cutout die 20 with plate 33 being a stripping plate that is secured to die 32 by the usual bolts 34, 34 as best shown in FIGURES 1 and 4 of the drawings. In this regard, both the die 32 and stripper 33 include a primary cutout 35 that corresponds in outline to the configuration of the primary male die component 20 so that the male component will press through and shear the material between the components for the purpose of cutting the same off to the appropriate contour.

Likewise and with respect to the auxiliary adjustable female die component 36, the same has openings 36a and 36b therein that correspond respectively to the T-shaped male projection 21a and circular male projection 21b respectively. In this fashion, these units are complemental and the units 21a and 21b can be respectively passed through the openings 36a and 36b so as to create a shearing action on material positioned in the path of such movement (see FIGURES 3 and 4).

For the purpose of adjustment of the female components, the frame portion 32 includes a series of tapped and threaded apertures 37, 37 that may be selectively engaged by screw 38 which is movable in the slot 39 of plate 36 so as to facilitate final adjustment with the entire unit 36 being shiftable longitudinally along the direction of arrow 40 (see FIGURE 4), and with the plate 32 being cutout as at 39a to permit the male punch and scrap to pass therethrough.

In use or operation of the improved adjustable progressive punch die, it will first be assumed that the component parts have been set to the position shown in FIGURES 1 through 4 of the drawings and this relationship is set forth schematically in FIGURE 5 of the drawings. In this regard and referring to FIGURES 1 and 5, the primary male die component 20 is shown sheering off the piece $S_1$. In FIGURE 1 a waste section W is shown schematically being removed and the edge $S_2$ is shown being cut on the leading end of the strip S by the die edge 20d, while the upper and lower edges $S_3$ and $S_4$ of the sipe are shown being reduced in heighth by being sheared by the edges 20f and 20g respectively, (see FIGURE 3 also.)

It will be noted that at the same time the die portion 21a and 21b will have been punching the hole $S_5$ and the slot $S_6$ in the strip member S.

As the material S progresses to the left of FIGURE 1, the operation above described will be repeated so that with each stroke a new sipe member $S_1$ will be produced.

Referring now to FIGURE 7, it will be noted that there is illustrated a conventional sipe of the type herein being described and it will be noted that in all instances, the dimension B is fixed, while the dimensions A, C, D, and E will be varied from size to size although being constant during production of a specific size. In this regard, in FIGURE 5, the overall dimension A is considerably less than in FIGURE 6 and accordingly a much narrower sipe is being produced even though the same punch components are being used. Accordingly, the stroke in FIGURE 5 will be less than the stroke in FIGURE 6 and in all instances, the stroke X, or the distance of material advance per cycle, is equal to the width A plus one-half of the thickness of the die component 20c.

While the above formulation is correct in instances where the locating aperture 24 and slot 25 are in the midpoint of the sipe, as shown in FIGURE 7, it is believed equally apparent that in instances where the locating aperture and slot are offset from the midpoint that it would be a mere matter of calculating a new dimension from the leading edge of the material as it advances through, with such calculation being known to the persons skilled in this art.

Thus and in FIGURE 5, the distance between the center line of the adjustable and fixed die members 20c and 21a is set at two and one-half times the stroke dimension X, with X being the distance between the cutout segments and corresponding identically to the amount of stroke feed that occurs during each cycle of operation. In this fashion, and upon completion of four cycles of operation, the member $S_1$ will be punched out as clearly shown in FIGURE 5. In this regard, and referring to FIGURE 1, the first punch will result in the holes $S_5$ and slot $S_6$ being punched out by the members 21b and 21a respectively.

As the material advances to the next cycle of operation, it is, of course, manifest, that an additional hole $S_5$ and slot $S_6$ will be punched, but as to the leading edge of the advancing material, no further punching operation will be effectuated during the second cycle of operation.

During the third cycle of operation, the edges $S_3$ and $S_4$ will be formed by edges 20f and 20g to determine the sipe height while the edge 20d will simultaneously cut the edge $S_2$ as shown in FIGURE 1, with the final cycle of operation serving to sever the part $S_1$ with edge 20e as clearly shown in FIGURE 1 of the drawings.

On the other hand in FIGURE 6 where the width A is considerably greater than the width A in FIGURE 5, the spacing between the fixed primary die 20 and the adjustable supplementary die 21 is one and one-half times the stroke X so that in every three cycles of operation, a sipe $S_1$ will be produced as clearly shown in FIGURE 6.

In each of the instances aforementioned, it is apparent that there has been some "lead" stroke provided so that the cycle can become operative after repetition of one or more cycles as the case may be.

It is believed obvious that the number of combinations available by the aforementioned arrangements are almost infinite in nature.

It will be seen from the foregoing that there has been produced a new and improved type of adjustable progressive punch die that is characterized by the fact that the same utilizes a unique arrangement of primary fixed die components, with auxiliary components that are adjustable along the longitudinal path of movement of the material being punched so as to permit an infinite number of width patterns to be cut with the same punch die material following the simple adjustment of the component parts.

While the disclosure has been set forth and particularly described in connection with the sipe for automobile tires, it is to be understood that the principles utilized herein are equally applicable in other fields of progressive die punching and accordingly applications of the invention to these fields are not intended to be precluded from the specific scope herein claimed.

Accordingly, modifications of the invention may be resorted to without departing from the spirit hereof or the scope of the appended claims.

I claim:

1. In combination with a punch press mechanism wherein a strip of material may be fed through the machine along a predetermined longitudinal path at preselected increments of movement during each punching cycle to progressively produce identical stampings, the improvement comprising:
   A) means for moving said strip of material uniformly along a longitudinal path of movement through said mechanism;
   B) an adjustable punch die including
      1) male and female die components that each include a primary fixed die configuration imparting component and an auxiliary adjustable die configuration imparting component that is shiftable relatively of the primary die component along the path of longitudinal movement of said strip material along the path of longitudinal movement of the material; said shifting movement of said adjustable die resulting in change of overall width dimension of said stamping (dimension A) while retaining the uniform planar edge configuration thereof.

2. The device of Claim 1 further characterized by the fact that the spacing between said primary die components and said auxiliary die componets is variable in relation to the rate of feed of said material whereby the width of the punched element may be varied by adjustment of said die components.

3. An adjustable punch die adapted to receive a moving strip of material of the character described, comprising:
   A) an upper die;
   B) a first male punch member
      1) attached to said upper die;
   C) a second male punch member
      1) attached to said upper die and
      2) spaced from and in alignment with said first male punch member along the line of movement of said material;
   D) first and second adjustment means for varying the spacing between said first and second male punch members along the line of movement of said material;
   E) a lower die;
   F) a first female cutout member
      1) attached to said lower die;
   G) a second female cutout member
      1) attached to said lower die and
      2) spaced from and in alignment with said first female cutout member;

H) first and second adjustment means for varying the spacing between said first and second female cutout members along the line of movement of said material; and I) said first and second male punch members and said first and second female cutout members being fixed against movement transversely of the line of movement of said material.